May 30, 1972     ICHIRO KITANO ET AL     3,666,347

SPHERICAL LENS STRUCTURES

Filed March 10, 1970

United States Patent Office 3,666,347
Patented May 30, 1972

3,666,347
SPHERICAL LENS STRUCTURES
Ichiro Kitano, Kobe, and Hiroyoshi Matsumura, Ashiya, Japan, assignors to Nippon Selfoc Kabushiki Kaisha (also known as Nippon Selfoc Co. Ltd.), Tokyo-to, Japan
Filed Mar. 10, 1970, Ser. No. 18,223
Claims priority, application Japan, Mar. 17, 1969, 44/20,190
Int. Cl. G02b 1/00, 3/00, 5/16
U.S. Cl. 350—96 B          5 Claims

ABSTRACT OF THE DISCLOSURE

A glass sphere containing thallium and sodium cations is immersed in a bath of a molten salt containing at least one kind of metal cations such as potassium cations to cause ion exchange through the glass-salt contact surface in a manner such that the concentrations of the cations, which constitute modifying oxides within the glass, vary from the center toward the outer surface of the sphere, which thereupon becomes a spherical lens with a refractive index $n$ representable by $$n = n_0 \left( \frac{1}{1 + (r/a)^2} \right)$$

wherein $n$ is the refractive index at a radial distance $r$ from the center, $n_0$ is the refractive index at the center, $a$ is a positive constant, and $(r/a)$ is less than one (unity).

BACKGROUND OF THE INVENTION

This invention relates generally to lens structures and more particularly to new spherical lens structures in each of which the refractive index decreases progressively from the centre toward the outer surface thereof and a process for producing the same.

Heretofore, it has been considered extremely difficult to produce lenses of small aperture and, moreover, of short focal length, and particularly lenses of small aperture and ultra-wide angle of field which can be put to practical use have never been developed.

SUMMARY OF THE INVENTION

It is an object of the invention to provide new spherical lens structures which make possible the practical realisation of small-aperture and ultra-wide-angle lenses. Another object of the invention is to provide a process for producing these spherical lens structures.

According to the present invention, briefly summarized, there are provided spherical glass lens structures, each containing at least two species of cations constituting modifying oxides, the concentrations of which vary from the centre toward the outer surface of the lens structure in a manner such that the distribution of the refractive index within the structure can be expressed substantially by the equation $$n = n_0 \left( \frac{1}{1 + (r/a)^2} \right) \quad (1)$$

wherein $n$ is the refractive index of the structure at a radial distance $r$ from the centre thereof, $n_0$ is the refractive index at the central part, $a$ is a positive constant, and $(r/a)$ is less than one (unity).

According to the present invention in another aspect thereof, there is provided a process for producing a spherical lens structure of the above stated character which is characterised by the step of causing a spherical glass body containing first cations capable of constituting modifying oxides to contact at and over the outer surface thereof an ionic source containing second cations capable of constituting modifying oxides thereby to cause the first cations to be substituted by the second cations through the contact surface with the final result that the above described refractive index distribution of the spherical glass structure is established therein.

The nature, principles, details, and utility of the invention will be more clearly apparent from the following detailed description beginning with general considerations and concluding with an example of preferred embodiment of the invention when read in conjunction with the accompanying drawing.

DETAILED DESCRIPTION

It has been made clear in optics that, theoretically, there are no aberrations whatsoever in the interior of an optical system having a refractive index distribution representable by Equation 1 set forth hereinbefore, and an example of such an optical system is known as Maxwell's fish-eye.

The present invention provides in a concrete and practical form lens structures in which this principle is utilised.

Figure 1:
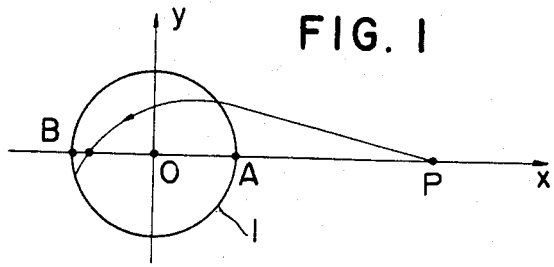
FIG. 1 is a diagram indicating the path of advance of a light ray through the interior of a spherical lens structure according to the invention for an explanation of the principle thereof.

Referring to FIG. 1, a light ray which has been emitted from a point P outside of a spherical lens structure 1 of the invention having a refractive index distribution according to Equation 1 and has entered this structure 1 advances therein along an arcuate path. This path can be represented by the following equation in terms of the $x$ $y$ coordinates as shown in FIG. 1.

$$(x + c \sin \alpha)^2 + (y - c \cos \alpha)^2 = a^2 + c^2 \quad (2)$$

where $$c = \frac{a}{2g} \sqrt{a^2 n_0^2 - 4g^2} \quad (3)$$

In these equations, $\alpha$ and $g$ are constants determined by the light incidence conditions.

Then, when the distance $l$ from the center O of the lens 1 to the point P is taken to conform to the relationship $$l = \frac{a^2 n_0 d}{a^2 n_0 - 2(a^2 - d^2)} \quad (4)$$

where $d$ is the radius of the spherical lens structure 1, light rays near the axis emitted from the point P and entering the spherical lens structure 1 through points in the neighborhood of point A collected at surface B on the side of the structure 1 oppositely remote from point P.

Figure 2:
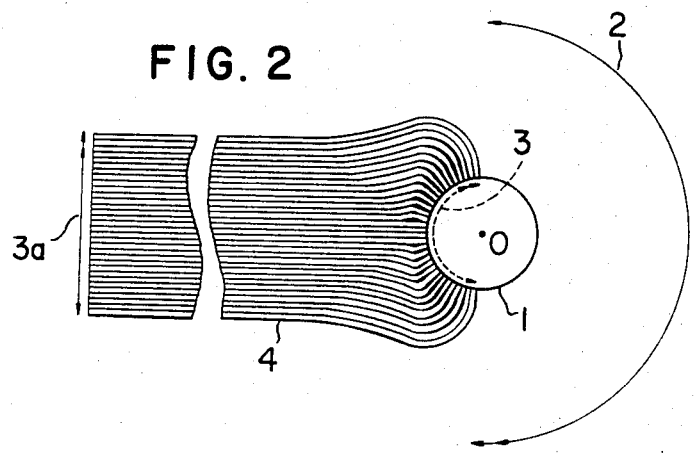
FIG. 2 is an enlarged diagrammatic side view, in longitudinal section with a part cut away for foreshortening, indicating the nature of the images formed when a spherical lens structure of the invention is used as the objective lens of a fibrescope image conductor.

Accordingly, it is possible to obtain an image 3 of an object 2 disposed in front of the spherical lens structure 1 at a distance $l$ according to Equation 4 from the centre thereof at substantially 180 degrees of angle and, moreover, at the surface of the lens structure 1 opposite from the object 2 as indicated in FIG. 2. By disposing one end of a bundle 4 of optical glass fibres in an orderly arrangement conforming to a definite relationship intimately against the surface of the lens 1 at which the image 3 is formed, preferably with the ends of all fibres perpendicular to the surface as indicated in FIG. 2, it is possible to conduct the image 3 to the other end of the glass fibre bundle 4 to obtain an image 3a.

The spherical lens structures of the invention can be produced, in general, in the following manner. First, a glass containing cations capable of constituting modifying oxides, particularly a glass containing an oxide of a metal such as $Tl$, and $Pb$, the ions of which have a relatively large magnitude of contribution to increase in the glass refractive index or a relatively large ratio of (electron polarizability)/(ion radius)$^3$ within the glass (hereinafter called a metal A), is melted and formed into spherical shape by a known process. Then, when necessary, the shape of this spherical glass structure is finished by a step such as polishing or etching.

Then, in order to establish a refractive index distribution conforming to Equation 1 set forth hereinbefore in the spherical glass structure thus prepared, this glass structure is immersed in a molten salt bath such as that of a nitrate or sulphate of a metal such as Li, Na, or K of relatively small magnitude of contribution to increase in the glass refractive index or of relatively small ratio of (electron polarizability)/(ion radius)$^3$ in the glass of the ion hereinafter called a metal B. The A ions within the glass structure are thereby substituted through the surface thereof by the B ions. As a result, the A ions which were nearer the outer surface of the glass structure are substituted in greater number by the B ions. Consequently, the distribution of the concentration of the A ions within the glass structure is such that the concentration progressively decreases from the centre toward the outer surface, while the concentration of the B ions is so distributed that it progressively increases from the centre toward the outer surface. Since the degree of this ion exchange varies with the temperature of the molten salt bath and the time period of immersion in this bath, a spherical glass structure of a desired refractive index distribution can be produced by appropriately adjusting these variables.

Furthermore, we have found that by using a salt bath containing not only B ions but a mixture of salts containing A ions of a concentration lower than that in the glass structure, it is possible to adjust the substitution quantity and substitution speed of bath A and B ions.

In Equation 1 given hereinbefore, since the quantity $(r/a)^2$ is normally much smaller than one (unity), Equation 1 can be approximated by the following equation.

$$n = n_0[1 - (r/a)^2] \qquad (1a)$$

On one hand, the ion exchange progresses principally in accordance with a diffusion theory equation. Accordingly, by subjecting the glass structure to the molten salt bath process for a time sufficient for the ion exchange to extend substantially to the central part of the spherical glass structure, even in the case where this ion exchange is continued under constant condition, a spherical glass structure having a substantially quadratic or second-degree distribution of refractive index thereof from the centre toward the outer surface except for the outer surface part and substantially satisfying Equation 1a can be obtained. We have found that the value of the constant $a$ in the foregoing equations is generally of the order of from 1.5 mm. to 4 mm. in the case where the diameter of the spherical glass structure is of the order of 1.5 mm.

If the spherical glass structure is contacting in a constant position the vessel containing the molten salt during the above described ion exchange, uniform ion exchange cannot be carried out over the entire outer surface of the spherical glass structure, and the desired refractive index distribution cannot be obtained. Therefore, it is desirable to vary continually the point at which the spherical glass structure contacts the vessel or to prevent the structure from contacting the vessel. While various methods are available for this purpose, we have found that an excellent technique comprises producing a steady supply of gas bubbles in the molten salt bath and thereby holding the glass sphere in a floating or suspended state in the bath at an intermediate depth thereof.

In the case wherein the refractive index distribution of a spherical lens structure obtained in the above described manner deviates from Equation 1 in the outer surface part thereof, this part may be removed by chemical etching or by grinding and polishing.

In order to indicate still more fully the nature and utility of the invention, the following example of practice illustrating a preferred embodiment of the invention is set forth, it being understood that this example is presented as illustrative and that it is not intended to limit the scope of the invention.

EXAMPLE

A glass having a composition by weight of 40 percent of $SiO_2$, 10 percent of $Na_2O$, and 50 percent of $Tl_2O$ was formed into a sphere of a diameter of 1.3 mm. The refractive index of this glass sphere was found to be uniformly 1.727.

Figure 3:
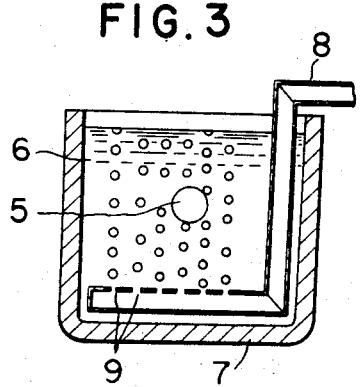
FIG. 3 is an elevation, in vertical section, showing an example of apparatus suitable for use in the process for producing the spherical lens structures according to the invention.

To establish the desired refractive index distribution in this spherical glass structure, it was immersed in a molten salt bath as illustrated in FIG. 3, in which the glass structure 5 is shown immersed in a molten salt 6 contained in a metal vessel 7, and a metal pipe 8 having a horizontal end part provided with a plurality of small holes 9 is placed in the molten salt 6 so that the horizontal end part is near the bottom of the vessel 7.

The molten salt 6 was maintained in a molten state by a heating device (not shown) provided outside of the vessel 7. Compressed air was passed through the pipe 8 and through the small holes 9 into the molten salt, whereupon air bubbles were formed therein and floated upward, whereby the spherical glass structure 5 was held in a contactless state with respect to the vessel 7, while being repeatedly rotated.

The composition of the molten salt 6 was a mixture of 0.5 percent by weight of thallium nitrate with potassium nitrate. The vessel 7 was heated by means of the heating device provided outside of the vessel, and the molten salt 6 was maintained at approximately 400 degrees C., at which temperature the contact between the glass sphere 5 and the molten salt 6 was continued for 300 hours to obtain the desired ion exchange.

More specifically, $Tl^+$ ions and $Na^+$ ions originally contained within the glass structure 5 fused out into the molten salt 6 through the surface of the glass structure, and, conversely, $K^+$ ions within the molten salt 6 entered the interior of the glass structure. As a result, the concentrations of the $Tl^+$ ions, and the $Na^+$ ions, and $K^+$ ions within the glass structure 5 progressive varied from the outer surface toward the centre of the structure. Consequantly, $Tl^+$ ions and $Na^+$ ions progressively decreased in concentration from the centre toward the outer periphery, while $K^+$ ions progressively increased from the centre toward the outer periphery.

Next, since the outer surface part of the glass structure 5 then had an undesirable refractive index distribution, it was removed. Specifically, the glass structure 5 was taken out of the molten bath 6, cooled slowly, washed with water, dried, and then immersed in a 3.3-percent (by weight) aqueous solution of hydrofluoric acid maintained at 20 degrees C. and agitated to impart vibration between the spherical glass structure and the solution. After approximately 5 minutes, the glass structure was taken out of the solution and washed with water to remove matter such as silicofluoride on the outer surface thereof. This process step of immersion in the hydrofluoric acid solution and washing with water was repeated 15 times, whereupon a spherical glass structure of a diameter of approximately 1.2 mm. was obtained. The surface of the structure thus obtained was polished to produce an optically perfect sphere.

Figure 4:
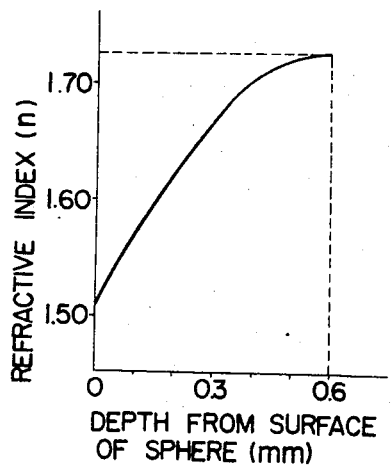
FIG. 4 is a graphical representation indicating the distribution of refractive index within a spherical glass structure obtained by one example of practice of the invention.

The distributions of the concentrations of thallium, sodium, and potassium in radial directions passing through the centre of this spherical glass structure were measured by an X-ray analysis technique. The results were converted into refractive index values, whereupon the refractive index distribution with respect to depth from the surface of the structure indicated in FIG. 4 was obtained. A refractive index distribution obtained by acutal measurement of refractive index was in agreement with this distribution obtained by conversion.

Since this distribution conforms substantially to Equation 1, this spherical glass structure was utilisable as a lens of short focal length and small aperture. In the specific case of this example, the value of $n_0$ was 1.727, and the value of $a$ was 1.57 mm. in Equation 1.

It was found that by placing the spherical lens structure thus obtained in intimate contact with one end of a bundle (of a diameter of approximately 1.2 mm.) of optical fibres arranged in an orderly manner, the structure could be utilised as an objective lens of a so-called fibrescope. When this fibrescope was tested in making observations, it was found that an object positioned approximately 5.5 cm. in front of the forward surface of the spherical lens could be clearly observed with a field of substantially 180 degrees.

The spherical lens structure according to the invention has a shorter focal length and less aberration than a contional spherical lens or glass bead having a uniform refraction index. Particularly when a spherical lens structure of the invention such as to satisfy the condition of infinitely large $l$ in Equation 4, i.e., zero value of the denominator of the right-hand side of Equation 4, in other words, such as to satisfy substantially the equation $$\frac{d^2}{a^2} = 1 - \frac{n_0}{2}$$

is selected, and a part of the outer surface, here considered the back surface, is coated with a light-reflecting coating, parallel incident light rays entering from any direction into this spherical lens through its front surface are reflected at the back side of the lens and return toward their original direction.

For example, a spherical lens of $n_0 = 1.60$, $d = 0.5$ mm., and $a = 2.25$ mm. satisfies the above equation. Accordingly, spherical lenses of this character can be used, for example, on a signboard such as a road sign whereby there is obtained a signboard with inscriptions of higher reflectivity than on signboards on which conventional spherical lenses of uniform reflective index (preferably a reflective index of 2.0) are used.

Furthermore, in the particular case of a spherical lens structure such as to satisfy the condition of $l = d$ in Equation 4, that is, of $a = d$, when an object is positioned in contact with one part of the outer surface of this lens, an image of the same size as the object is formed on the oyposite lense surface without any aberration whatsoever.

We claim:
1. A one-piece spherical lens structure comprising a spherical body of glass of a composition including thallium oxide to provide in said glass, thallium ions having the characteristic of increasing the refractive index of the glass, said spherical glass body having at least one specie of metal ions selected from the group consisting of lithium ions, sodium ions, and potassium ions diffused into said body uniformly from the entire outer surface of said spherical glass body toward the center and substituted for thallium ions so that the concentration of said thallium ions decreases from the center toward the outer surface of the spherical glass body and the concentration of said selected metal ions increases from the center toward the outer surface of the spherical glass body to provide a distribution of the refractive index within the lens structure expressed substantially by the equation

$$n = n_0 \left[ \frac{1}{1 + (r/a)^2} \right]$$

wherein $n$ is the refractive index at a radial distance $r$ from the center of the structure, $n_0$ is the refractive index at the central part thereof, $a$ is a positive constant, and $(r/a)$ is less than one whereby an object at a distance 1 from the center of the lens is focused on the surface of the lens in accordance with the relationship $$l = \frac{a^2 n_0 d}{a^2 n_0 - 2(a^2 - d^2)}$$

where $d$ is the radius of the spherical lens structure.

2. A spherical lens structure according to claim 1, in which the composition of said glass body is approximately 40% of $SiO_2$, 10% of $Na_2O$ and 50% of $Tl_2O$ and in which said selected metal ions are potassium ions.

3. A spherical lens structure according to claim 1, in which the diameter of said glass body is of the order of 1.5 mm.

4. A lens system comprising a spherical lens structure according to claim 1 and a bundle of optical fibers terminating at the surface of said spherical lens structure with the ends of all fibers perpendicular to the surface, the refractive index distribution within said spherical lens structure being selected to form an image at the surface of said structure engaged by said optical fiber bundle.

5. A lens system according to claim 4, in which said fiber bundle engages approximately half the surface of said spherical lens structure.

References Cited

UNITED STATES PATENTS

| | | | |
|---|---|---|---|
| 3,255,453 | 6/1966 | Horst | 350—191 X |
| 3,166,623 | 1/1965 | Waidelich | 350—96 B |
| 3,486,808 | 12/1969 | Hamblen | 350—175 GN UX |

OTHER REFERENCES

Gunderson et al.: "Microwave Luneburg Lens," Applied Optics vol. 7, No. 6, pp. 801–804, May 1968.

JOHN K. CORBIN, Primary Examiner

U.S. Cl. X.R.

65—30; 350—175 GN, 175 SL